United States Patent [19]
Weelink

[11] Patent Number: 5,303,673
[45] Date of Patent: Apr. 19, 1994

[54] DISPLACEABLE FEEDING FENCE

[76] Inventor: Johannes M. W. Weelink, No. 58, Tynaarlosestraat, NL-9481 ad Vries, Netherlands

[21] Appl. No.: 989,839

[22] Filed: Dec. 16, 1992

[30] Foreign Application Priority Data

Dec. 17, 1991 [BE] Belgium .................. 9101148

[51] Int. Cl.⁵ .............................. A01K 1/10
[52] U.S. Cl. ........................................... 119/60
[58] Field of Search ............. 119/16, 20, 54, 52.1, 119/52.4, 58, 59, 60, 10; 180/131; 256/1, 14, 16

[56] References Cited

U.S. PATENT DOCUMENTS

| | | | |
|---|---|---|---|
| 3,738,327 | 6/1973 | Stirling | 119/51.01 |
| 4,419,963 | 12/1983 | Willibrordus | 119/58 X |
| 5,054,430 | 10/1991 | Weelink | 119/60 |

FOREIGN PATENT DOCUMENTS 61817 10/1982 European Pat. Off. .
397257 11/1990 European Pat. Off. .

Primary Examiner—Gene Mancene
Assistant Examiner—Thomas Price
Attorney, Agent, or Firm—Wegner, Cantor, Mueller & Player

[57] ABSTRACT

This invention relates to a displaceable feeding fence for cattle. The feeding fence comprises an elongate frame, support and drive means for supporting the frame for stable displacement over the ground surface and for displacing the frame thereover, and a fence mounted on the frame with openings through which the animals can place their head. The support means comprise a floor plate extending rearward of the frame and scraping means are arranged which are formed by a downward protruding scraping edge on the rear side of the floor plate and a scraper plate having a downward protruding scraping edge on the front side of the frame.

5 Claims, 3 Drawing Sheets

DISPLACEABLE FEEDING FENCE

The invention relates to a displaceable feeding fence for cattle. Such a feeding fence is disposed close to a quantity of fodder and the cattle can consume a portion of the fodder via the openings in the fence. By gradually displacing the fence in the direction of the quantity of fodder the fodder is taken up gradually, wherein is ensured that none or only a minimal amount of the fodder is lost due to wastage.

Because the animals stand with their front legs on the floor plate the feeding fence cannot be pushed over. The fence can thus be disposed movably on the ground surface. The embodiment can be such that the fence is displaced by the animals themselves in the direction of the fodder and, when the fodder has been consumed, is moved back using the drive means or is displaced once or several times a day by suitable actuation of the drive means to a suitable distance related to the quantity of fodder to be taken up by the cattle.

The known feeding fences have the drawback that after a period of time the ground surface over which the fence is moved back and forth becomes dirtied by fodder remnants and manure so that the feeding fence can no longer be displaced without problem. The floor must then first be cleaned before a good operation can once again be obtained.

The invention now has for its object to provide a feeding fence of the type described in the preamble wherein this problem is obviated to a considerable extent.

This object is achieved with a displaceable feeding fence for cattle as described in claim 1. The scraping edge on the rear side of the floor plate ensures that, when the feeding fence is moved back at the start of a new feeding cycle, the manure deposited on the ground is scraped away. The scraping edge of the scraper plate on the front side ensures that the fodder remnants are carried along during displacement in the direction toward the fodder. At each movement of the feeding fence the ground surface is thus scraped clean so that dirtying thereof is at least very considerably reduced.

A favourable embodiment of the feeding fence according to the invention is characterized in claim 2. Due to the location of the centre of gravity of the device the rear scraping edge remains at all times in contact with the ground surface and with the step of this claim the leading scraping edge moreover remains at all times in contact with the ground surface even when this is relatively uneven.

A favourable construction is herein characterized in claim 3.

The scraper plate can be removed in simple manner, for instance to gain access to the support and drive means, when the step of claim 4 is applied.

It has been found that the step of claim 5 has the advantage that the cattle takes up the fodder lying on the ground better, thus achieving improved efficiency. The limited displacement potential of the feeding fence prevents the feeding fence being moved back over a distance such that a portion of the ground surface, which was first situated behind the fence and on which manure was lying, comes to lie in front of the fence. It has been found namely that the cattle takes up fodder less easily from a ground surface that has been contaminated with manure and still carries the odour of manure.

The invention will be elucidated in the following description with reference to the annexed figures.

Figure 1:
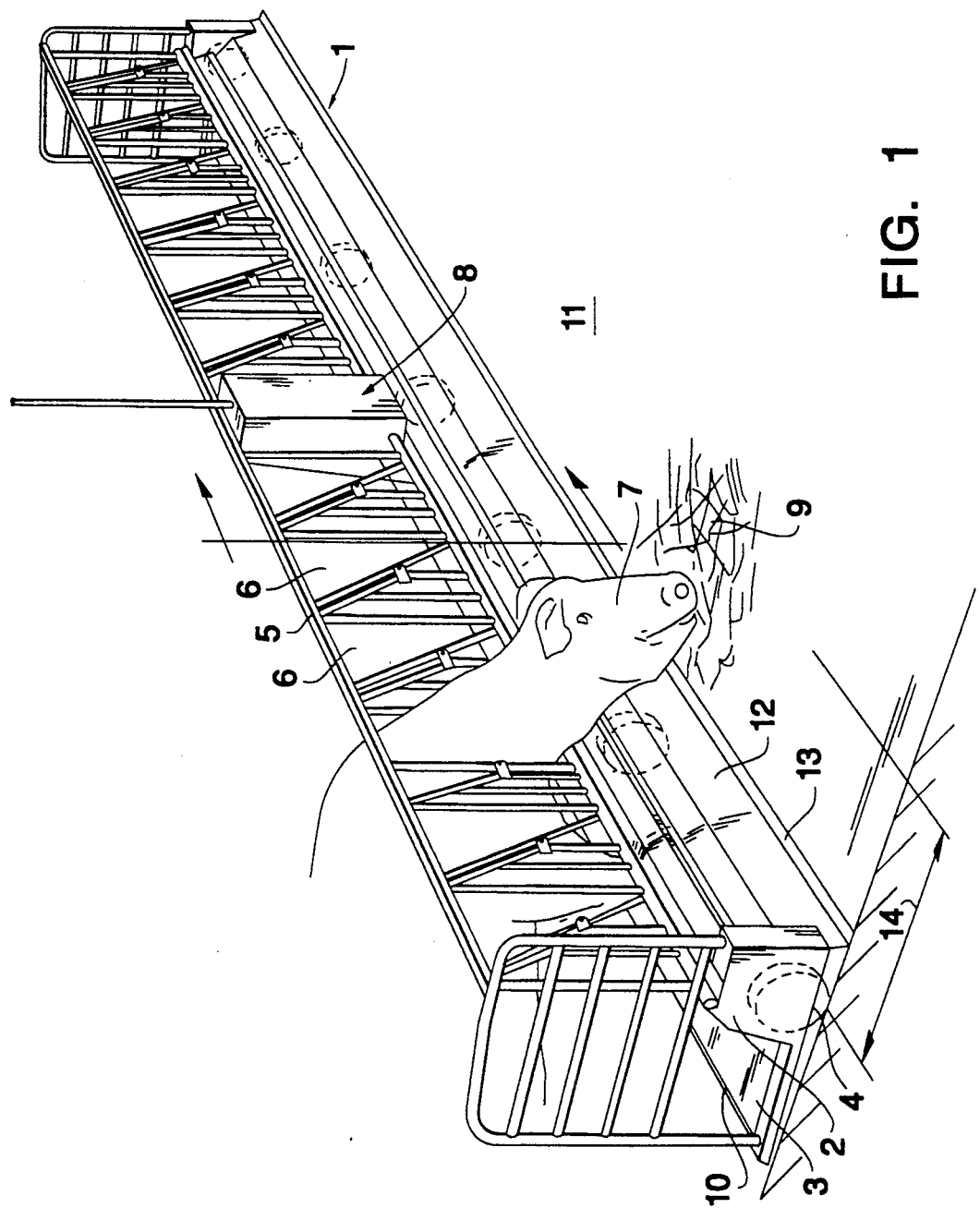
FIG. 1 shows a schematic perspective view of an embodiment of the feeding fence according to the invention.

The displaceable feeding fence device 1 shown in FIG. 1 comprises an elongate frame 2 on which is mounted an actual feeding fence 5 of known self-catching type. In this feeding fence 5 is defined a number of openings 6 through an animal 7 can push its head in order to consume fodder 9 lying on the ground 11 in front of the fence 1. During feeding the animal 7 stands with its front legs on a floor plate 3 extending to the rear of the frame 2 whereby the whole fence 1 remains in stable position despite possible pressure exerted by the animal 7.

The displaceable feeding fence 1 is supported on the ground surface 11 using a number of wheels 4 and with the rear wall of the floor plate 3. The wheels 4 can be driven using a driving 8 in order to displace the fence in forward or rearward direction.

Figure 2:
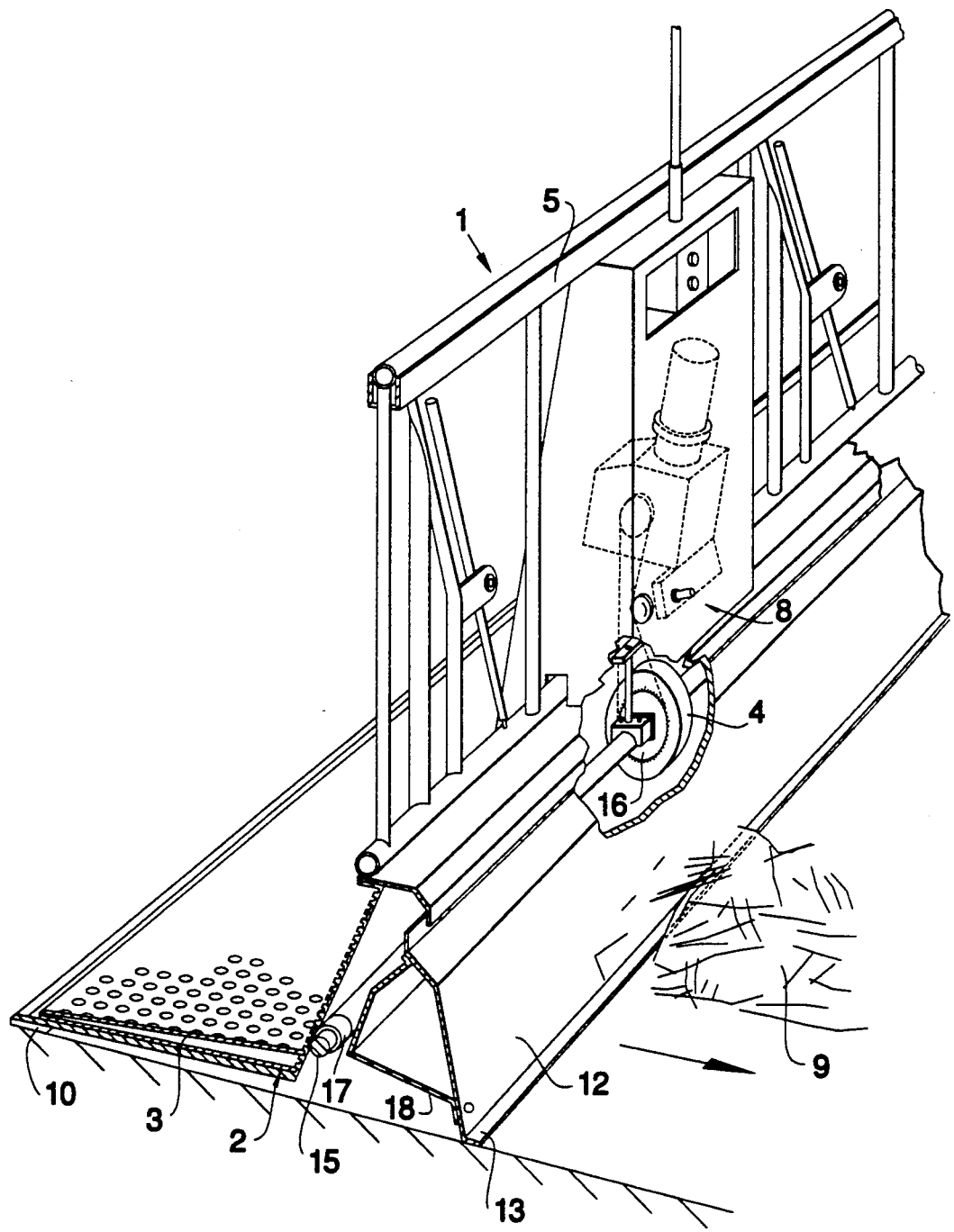
FIG. 2 shows the feeding fence of FIG. 1 in partly sectional perspective view.

As shown in more detail in FIG. 2, the wheels 4 are mounted on a shaft 15 extending in longitudinal direction of frame 2 and the schematically designated drive 8 engages on this shaft by means of a chain transmission 16.

According to the invention the floor plate 3 is provided on the rear side with a scraping edge 10 which, during movement to the left as seen in FIG. 1 and 2, that is, moving back of the feeding fence 1, scrapes away manure lying on the ground surface 11. This prevents dirtying of the floor surface over which the feeding fence 1 is reciprocally displaced, whereby the movement of the fence would be obstructed.

In addition to the scraping edge 10 on the rear edge of floor plate 3 the scraping means contain a scraper plate 12 with a scraping edge 13 supported on the ground at the front of the fence 1. In the preferred embodiment shown in the figures the scraper plate 12 is provided with a holding construction 18 bearing hooks 17 with which the assembly is hooked to the shaft 15. Due to these hooks the scraper plate 12 can swivel on the shaft 15 so that the scraping edge 13 thereof remains at all times in contact with the ground surface 11. During displacement to the right as seen in the figures the fodder 9 lying on the ground is carried along with the scraping edge 13 and the scraper plate 12, thus preventing the portion of the floor surface over which the fence is reciprocally displaced being contaminated with fodder remnants.

The fence 1 is further embodied in favourable manner such that the drive 8 displaces the feeding fence 1 reciprocally over a distance designated with 14 that is smaller than the distance between the trailing scraping edge 10 and the leading scraping edge 13. This prevents the feeding fence 1 being moved back so far that a portion of the floor surface first situated behind the feeding fence comes to lie in front of the feeding fence. The cattle do not therefore have to take up fodder 9 from a floor surface smelling of manure whereby the fodder take-up from the ground is not unfavourably affected.

Figure 3:
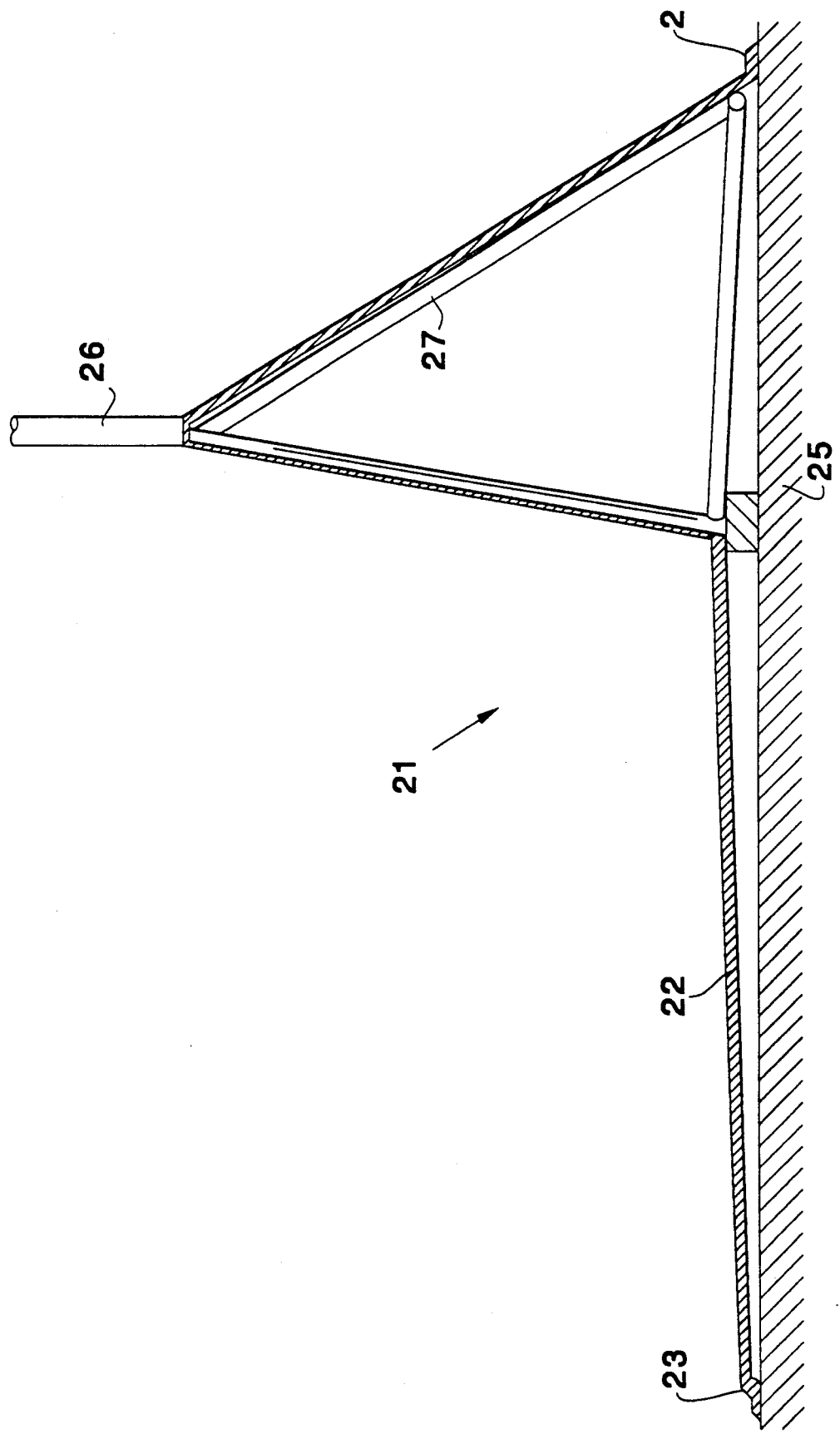
FIG. 3 shows a cross section of a feeding fence according to the invention in another embodiment.

The feeding fence 21 according to the invention as shown in FIG. 3 is not provided with wheels but can slide freely over the floor surface. This feeding fence comprises a frame 27 of triangular section which is covered on the right-hand side in FIG. 3 with a plate ending in a scraping edge 24. On the left of the frame 27 as seen in FIG. 3 extends a floor plate 22 corresponding with the floor plate 3 of the feeding fence as shown in FIG. 1 and 2. Floor plate 22 ends in a scraping edge 23 which rests on the floor surface. Mounted on the frame 27 is a fence 26 which, as for instance in the foregoing embodiment, can be a self-catching feeding fence.

On the underside of frame 27 the feeding fence 21 has at a number of locations a support block 25 which serves as additional support of the feeding fence 21 on the ground. These support blocks 25 are not essential, however. In the case of a feeding fence such as the feeding fence 21 of FIG. 3 the whole fence rests essentially on the leading scraping edge 24 and the trailing scraping edge 23, thus obtaining a good contact with the ground surface, and therefore a good scraping action during both the forward and return movement The floor surface over which the feeding fence 21 is reciprocally displaced thus remains well free of fodder remnants and manure.

I claim:

1. A displaceable feeding fence for cattle comprising an elongate frame having a front side, support means for supporting the frame for stable displacement over a ground surface comprising a floor plate having a rear side extending rearward of the frame, drive means for displacing the frame over the ground surface, a fence mounted on the frame with openings through which animals can place their head, a downward protruding scraping edge on the rear side of the floor plate, and a scraper plate having a downward protruding scraping edge on the front side of the frame.

2. A displaceable feeding fence for cattle comprising an elongate frame having a front side, support means for supporting the frame for stable displacement over a ground surface comprising a floor plate having a rear side extending rearward of the frame, drive means for displacing the frame over the ground surface, a fence mounted on the frame with openings through which animals can place their head, a downward protruding scraping edge on the rear side of the floor plate, and a scraper plate having a downward protruding scraping edge on the front side of the frame wherein the scraper plate is connected to the frame for swivelling on a horizontal swivel shaft extending in lengthwise direction of the frame.

3. Displaceable feeding fence as claimed in claim 2, wherein the support means comprise wheels which are mounted on a shaft extending in the lengthwise direction of the frame and wherein the scraper plate is mounted for swivelling on this shaft.

4. Displaceable feeding fence as claimed in claim 3, wherein the scraper plate is suspended from the shaft with hooks.

5. Displaceable feeding fence as claimed in claim 1, wherein the drive means can move the feeding fence reciprocally over a distance that is smaller than the distance between the scraping edges.

* * * * *